United States Patent Office 3,367,923
Patented Feb. 6, 1968

3,367,923
PROCESS FOR THE POLYMERIZATION
OF OLEFINS
Tsutomu Tanaka and Tadaichi Tokuzumi, Hiroshima-ken, and Hiroshi Fujimura, Yamaguchi-ken, Japan, assignors to Mitsui Petrochemical Industries, Ltd., Tokyo, Japan, a corporation of Japan
No Drawing. Filed Feb. 5, 1964, Ser. No. 342,774
Claims priority, application Japan, Mar. 11, 1963, 38/11,018
11 Claims. (Cl. 260—88.2)

The present invention relates to an improvement on Ziegler process for the polymerization of olefins.

It is the main object of the present invention to provide a process useful for industry in such points that the molecular weight of polyolefins produced may be regulated and thereby powdered polyolefins having, in particular, a high impact strength can be obtained in a high yield.

In this specification by the term "polymerization" we means polymerization and copolymerization.

The catalyst to be used in the process of the present invention comprises (1) at least one organic aluminium compound, (2) at least one compound of a heavy metal selected from the group consisting of metals of Groups IV to VI of Periodic Table, provided that at least one of these metal compounds (1) and (2) is present in the form of an alkoxy or aryloxy compound and (3) a substance selected from the group consisting of organo-polybasic acid esters, esters of organic acids with polyalcohols and polysiloxanes. It has already been known in Japanese Patent Publications Nos. 6642/62 and 3393/62 that the above catalyst gives a polyolefin having very high apparent density. Although, in such case, a polyolefin having a suitable molecular weight for molding it may be obtained, said polyolefin is still lacking sufficient impact strength for uses such as injection molding.

We have now found that in the practice of the polymerization according to the above processes, if the polymerization or copolymerization of olefins is carried out in presence of hydrogen, the above disadvantages can be reduced.

The organim aluminium compounds to be used in the process of the present invention are as follows:

(1) Aluminium trialkyl
(2) Aluminium compound represented by the general formula, $AlR_{3-n}X_n$ wherein R stands for, same or different, hydrogen atom or hydrocarbon residue and X stands for hydrogen or halogen atom, alkoxy or aryloxy group, sec-amide, sec-amine, mercaptan or thiophenol group or carboxylic acid or sulphonic acid residue.

The compound of heavy metals selected from the group consisting of metals of Groups IV to VI of Periodic Table which is used in the process of the present invention may be a halide, alkoxy or aryloxy compound of metals such as titanium, zirconium, hafnium, vanadium, niobium, tantalum, molybdenum, tungsten, thorium and uranium. Thus the alkoxy metallic compound may be an aluminium alkoxy or aryloxy compound or an alkoxy or aryloxy compound of metals IV to VI of Periodic Table.

Various organo-polybasic acid esters or esters of organic acids with polyalcohols may be used. As the example of organo-polybasic acid esters, there are mentioned for example esters of an aliphatic dibasic acid such as succinic and adipic acids or aromatic dibasic acid such as phthalic acid with an aliphatic alcohol such as methyl, ethyl, butyl, hexyl, octyl, decyl and higher alcohols or an aromatic alcohol such as benzyl and phenylethyl alcohols. The specially preferable one is dibutyl, dioctyl or higher ester of phthalic acid. As the examples of esters of organic acids with polyalcohols, there are mentioned esters of an aliphatic acid with an aliphatic polyalcohol such as ethylene glycol, glycerine and diethylene glycol. The specially preferable one is an ester of higher aliphatic acid with glycerine, namely animal and vegetable oils and fats. As the examples of polysiloxanes, there are mentioned linear or cyclic siloxane polymer represented by the following general formula,

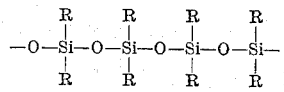

wherein R stands for alkyl group for example methyl group or aryl group for example phenyl group, which has a viscosity of from several centistokes to 1,000,000 centistokes at 25° C.

In the catalyst mixture containing at least one alkoxy metallic compound, the ratio of the organic aluminium compound to the compound of metal selected from metals of Groups IV to VI of Periodic Table may be varied within a wide range. The amounts of the organopolybasic acid esters, esters of organic acids with polyalcohols and polysiloxanes may also be used over a wide range, and the preferred range thereof is 0.001 to 1.0%, particularly 0.005 to 0.1% of the solvent to be used in the polymerization.

In the polymeriaztion of the process of the present invention, the polymerization of ethylene or copolymerization of ethylene with another olefin such as propylene and butene-1 can be suitably carried out in presence of hydrogen. The hydrogen may be added into the reaction system in whole amount at a stroke in the first stage of polymerization or in the divided amount or in a continuous manner.

In order to obtain polyethylene or ethylene copolymer having a suitable molecular weight for molding, the amount of hydrogen to be added may be varied within a wide range repending upon process for the addition of hydrogen, kind of catalyst, temperature, pressure and amount of other monomer such as propylene to be added, and the preferable amount of hydrogen is about 0.1 to 10% by volume of ethylene used in the polymerization. Although the polymerization may be carried out at a temperature of from ambient temperature to about 100° C., the suitable temperature is specially 20° to 80° C. As examples of solvent to be used in the process of the present invention, there are especially mentioned an aliphatic, cycloaliphatic or aromatic hydrocarbon or a mixture thereof, although any solvent used in the Ziegler process may be used.

In case the impact strength of injection molded article is measured, Izod or Charpy impact values based upon the A.S.T.M. method may not always correspond to the practical strength. In view of this, the falling-ball testing method is superior to the above methods as the practical testing of the strength of molded article as described in R. A. Horsley, "British Plastics," vol. 32, page 1956, April 1959, and P. I. Vincent, "Plastics," vol. 27, page 138, June 1962. Also, it is said that the practical strength of molded article corresponds to the impact strength at the neighborhood of the gate.

The test used for the impact strength in the present invention was carried out by the falling-ball testing method in which a polymer to be measured was molded by injection to obtain a disk as a sample and a weight was dropped down onto the central gate of disk. Namely, the sample of 85 mm. radius and 2 mm. thickness was used and a rod of which the weight was 1 kg. and the point had a hemisphere shape of 12.5 mm. radius was dropped down onto the sample by changing the height of rod. Where minimum height at the destruction of sample was represented by a cm., the impact strength is expressed in 1× a cm. kg.

The present invention is further illustrated by the following examples. In the examples, the operation was carried out in absence of oxygen and water until the polymerization was completed.

*Example 1*

250 l. of purified kerosene were charged into a polymerization reaction vessel provided with an agitator and then 234 g. of monoethoxydiethyl aluminum, 570 g. of titanium tetrachloride and 50 g. of rapeseed oil were added thereto. Hydrogen was introduced into the vessel until the internal pressure was reached to 1.0 kg./cm.$^2$ (corresponding to 0.40% by volume of hydrogen based on total feed of ethylene) and thereafter ethylene was fed therein at the rate of 10 kg./hr. at the temperature of 60° C. After 12 hours, the reaction was stopped by the addition of methanol. The reaction product was filtered off, washed and dried to obtain 120 kg. of powdered polyethylene having the molecular weight of 32,000 and apparent density of 0.370. The impact strength of it was 130 cm.kg.

For comparison, the above procedure was repeated except that no hydrogen was added and the amount of titanium tetrachloride was increased to 760 g. As the result, 119 kg. of polyethylene having the molecular weight of 39,000 and apparent density of 0.385 were obtained. The impact strength of it was 60 cm.kg.

It is clear that the impact strength of product which is polymerized in presence of hydrogen is higher than that of product which is polymerized in absence of hydrogen.

*Example 2*

250 l. of purified kerosene were charged into a polymerization reaction vessel provided with an agitator and then 228 g. of monoethoxydiethyl aluminum, 475 g. of titanium tetrachloride and 50 g. of dioctyl ester of phthalic acid were added thereto. Then, hydrogen was introduced therein until the internal pressure was reached to 0.6 kg./cm.$^2$ (corresponding to 0.20% by volume of hydrogen based on total feed of ethylene) and thereafter a gaseous mixture of ethylene-propylene containing 1.2 mols percent of propylene was fed into the vessel at the rate of 10 kg./hr. at the temperature of 60° C. for 15 hours. The reaction product was decomposed by the addition of methanol and was filtered and separated as an insoluble precipitate. The precipitate was washed and then dried to obtain 147 g. of copolymer having the molecular weight of 38,000 and apparent density of 0.420 and containing 6.4 methyl groups per 1,000 carbon atoms. The impact strength of the copolymer was 16 cm.kg.

For comparison the above procedure was repeated except that hydrogen was not added and the amount of titanium tetrachloride was increased to 665 g. As the result, 147 kg. of ethylene-propylene copolymer having the molecular weight of 42,000 and apparent density of 0.417 was obtained. The impact strength of it was 70 cm.kg.

It is clear that the impact strength of product which is copolymerized in presence of hydrogen is higher than that of product which is copolymerized in absence of hydrogen.

*Example 3*

250 l. of purified kerosene were charged into a polymerization reaction vessel provided with an agitator and then 560 g. of monooctoxy titanium trichloride, 190 g. of titanium tetrachloride, 217 g. of diethyl aluminium monochloride and 50 g. of a linear dimethyl-polysiloxane having the viscosity of 100 centistokes were added thereto. Hydrogen was introduced into the vessel until the internal pressure was reached to 0.4 kg./cm.$^2$ (corresponding to 0.12% by volume of hydrogen based on total feed of ethylene) and thereafter a gaseous mixture of ethylene-butene-1 containing 0.85 mols. perent of butene-1 was fed therein at the rate of 10 kg./hr. at the temperature of 60° C. After 17 hours 40 minutes, the obtained reaction mixture was treated as described in the above examples to obtain 170 kg. of ethylene-butene-1 copolymer having the molecular weight of 35,000 and apparent density of 0.428 and containing 3.8 methyl groups per 1,000 carbon atoms. The impact strength of it was 110 cm.kg.

For comparison, the above procedure was repeated except that hydrogen was not used and 545 g. of monooctoxy titanium trichloride, 299 g. of titanium tetrachloride and 211 g. of diethyl aluminium monochloride were used. As the result, 172 kg. of ethylene-butene-1 copolymer having the molecular weight of 40,000 and apparent density of 0.421 and containing 4.2 methyl groups per 1,000 carbon atoms was obtained. The impact strength of it was 60 cm.kg.

In all examples, the unit of pressure is the gauge pressure.

What we claim is:

1. A process for the polymerization of olefins wherein at least one ethylenically unsaturated hydrocarbon is contacted in a solvent with a catalyst comprising (1) at least one organic aluminium compound, (2) at least one compound of a metal selected from the group consisting of metals of Groups IV to VI of Periodic Table, provided that at least one of these metal compounds (1) and (2) being present in the form of alkoxy or aryloxy compound and (3) a substance selected from the group consisting of organic polybasic acid esters, esters of organic acids with polyalcohols and polysiloxanes, characterized in that the polymerization is carried out in presence of hydrogen to attain a higher impact strength than without hydrogen for the resulting product.

2. A process according to claim 1 wherein the ethylenically unsaturated hydrocarbon is a member selected from the group consisting of ethylene, propylene, butene-1 and a mixture thereof.

3. A process according to claim 1 wherein the solvent is a member selected from the group consisting of aliphatic, cycloaliphatic and aromatic hydrocarbons and mixture thereof.

4. A process according to claim 1 wherein the organic aluminium compound is at least one member selected from the group consisting of aluminium trialkyls and aluminium compounds represented by the general formula $AlR_{3-n}X_n$ wherein R stands for, same or different, hydrogen atom or hydrocarbon residue and X stands for hydrogen atom, halogen atom, alkoxy or aryloxy group, sec-amide, sec-amine, mercaptan or thiophenol group or carboxylic acid or sulphonic acid residue.

5. A process according to claim 1 wherein the compound of a metal selected from the group consisting of metals of Groups IV to VI of Periodic Table is at least a member selected from the group consisting of a halide and alkoxy compound of titanium, zirconium, hafnium, vanadium, niobium, tantalum, molybdenum, tungsten, thorium and uranium.

6. A process according to claim 1 wherein the organopolybasic acid ester is a member selected from the group consisting of esters of an aliphatic dibasic acid with an aliphatic alcohol or an aromatic alcohol and esters of an aromatic dibasic acid with an aliphatic alcohol or an aromatic alcohol.

7. A process according to claim 1 wherein the ester of organic acids with polyalcohols is an ester of an aliphatic acid with an aliphatic polyalcohol selected from the group consisting of ethylene glycol, glycerine and diethylene glycol.

8. A process according to claim 7 wherein the ester of organic acids with polyalcohols is a member selected from the group consisting of animal and vegetable oils and fats.

9. A process according to claim 1 wherein the polysiloxane is a member of linear and cyclic siloxane polymers represented by the following general formula:

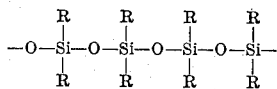

wherein R stands for alkyl group for example methyl group and aryl group for example phenyl group, which has a viscosity of from several centistokes to 1,000,000 centistokes at 25° C.

10. A process according to claim 1 wherein the amount of hydrogen is 0.1 to 10% by volume based upon olefins to be fed.

11. A process according to claim 1 wherein the polymerization temperature is from normal temperature to 100° C., preferably 20° to 80° C.

References Cited

UNITED STATES PATENTS 3,230,208  1/1966  Coover _____ 260—94.9

FOREIGN PATENTS

37–3,393  7/1962  Japan.
37–6,642  8/1962  Japan.

OTHER REFERENCES

Sittig, Polyolefin Resin Processes (1961), P50.

JOSEPH L. SCHOFER, *Primary Examiner.*

L. EDELMAN, *Assistant Examiner.*